US008899270B2

(12) United States Patent
Engelberg

(10) Patent No.: US 8,899,270 B2
(45) Date of Patent: Dec. 2, 2014

(54) PISTON ACCUMULATOR

(75) Inventor: Ralph Engelberg, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/575,090

(22) PCT Filed: Dec. 29, 2010

(86) PCT No.: PCT/EP2010/070866

§ 371 (c)(1),
(2), (4) Date: Nov. 7, 2012

(87) PCT Pub. No.: WO2011/091936

PCT Pub. Date: Aug. 4, 2011

(65) Prior Publication Data

US 2013/0048126 A1 Feb. 28, 2013

(30) Foreign Application Priority Data

Jan. 26, 2010 (DE) ........................ 10 2010 001 200

(51) Int. Cl.
*F16L 55/04* (2006.01)
*F15B 1/24* (2006.01)

(52) U.S. Cl.
CPC ............... *F15B 1/24* (2013.01); *F15B 2201/31* (2013.01); *F15B 2201/405* (2013.01)
USPC .............................................. 138/31; 138/30

(58) Field of Classification Search
USPC ...................................................... 138/31, 30
See application file for complete search history.

(56) References Cited

U.S. PATENT DOCUMENTS 2,417,873 A * 3/1947 Huber ............................ 138/31
2,703,108 A * 3/1955 McCuistion .................... 138/31
2,715,419 A * 8/1955 Ford et al. ....................... 138/31
2,742,929 A 4/1956 Treseder
2,775,255 A * 12/1956 Snyder ....................... 137/87.01
2,829,672 A 4/1958 Bleasdale
2,829,673 A 4/1958 Reese
3,047,023 A * 7/1962 Dick .............................. 138/31
3,136,340 A * 6/1964 Wildi et al. ..................... 138/31
3,474,830 A * 10/1969 Siegfried ......................... 138/30
3,863,676 A * 2/1975 Tarsha ............................ 138/31
4,714,094 A 12/1987 Tovagliaro
(Continued)

FOREIGN PATENT DOCUMENTS

CN 101142434 3/2008
DE 3617957 12/1986
DE 3920030 12/1989
DE 102006060078 6/2008

OTHER PUBLICATIONS

International Search Report, PCT International Application No. PCT/EP2010/070866, dated Apr. 19, 2011.

*Primary Examiner* — James Hook
(74) *Attorney, Agent, or Firm* — Kenyon & Kenyon LLP

(57) ABSTRACT

A piston accumulator, having a pressure vessel; a cylinder, which is situated within the pressure vessel; an interspace formed between the pressure vessel and the cylinder; and a separating piston, which is provided movably in the cylinder; in which a hydraulic fluid acts upon on a first side of a separating piston, and a gas acts upon a second side of the separating piston; and in which the gas is in fluidic connection to the interspace and the hydraulic fluid is in fluidic connection to a connection on the cylinder.

4 Claims, 1 Drawing Sheet

(56) References Cited

U.S. PATENT DOCUMENTS 7,108,016 B2 * 9/2006 Moskalik et al. ............... 138/31
2005/0194054 A1 9/2005 Moskalik et al.
2008/0308168 A1 * 12/2008 O'Brien et al. ................. 138/31

* cited by examiner

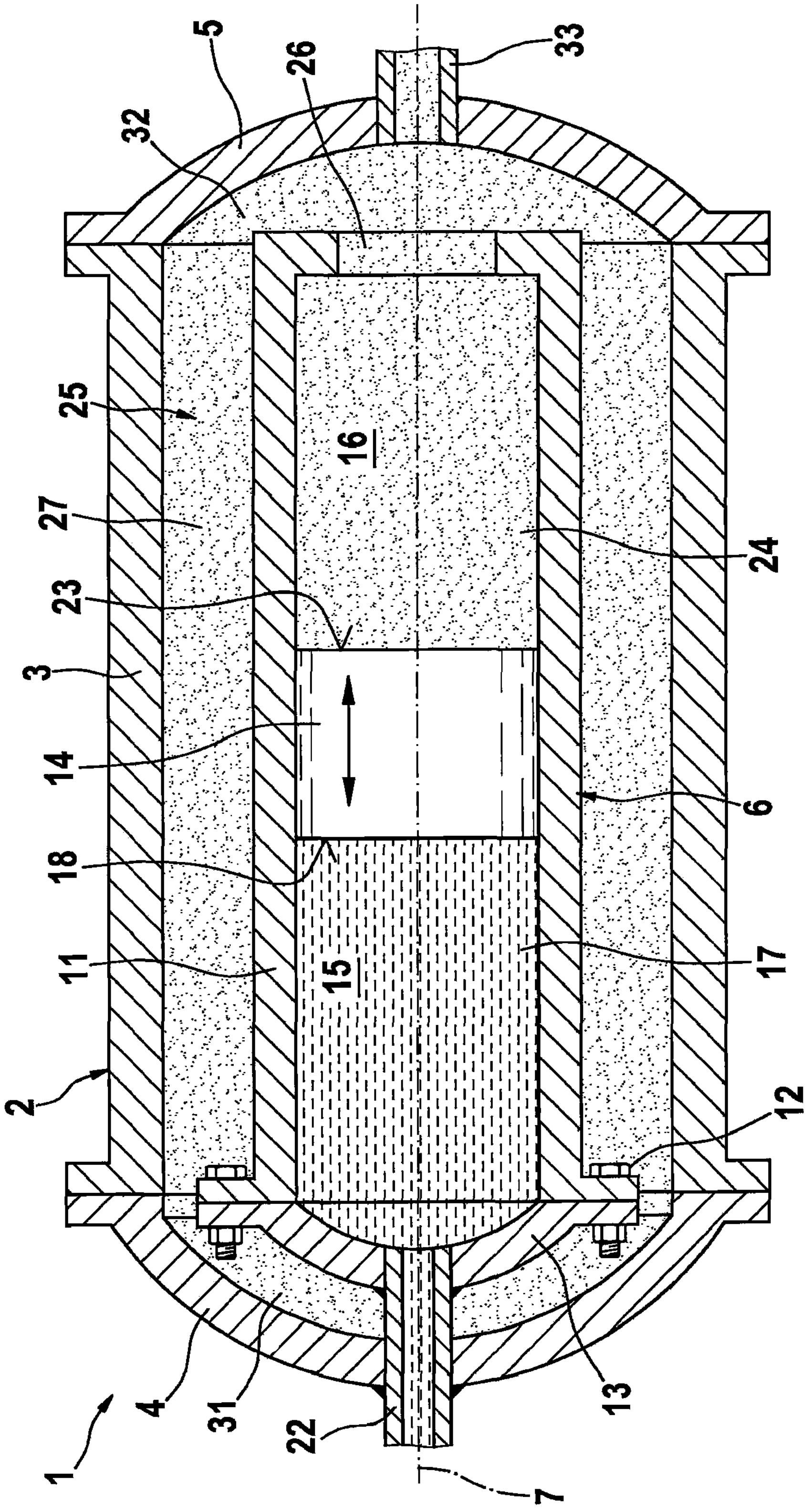
5
26
33
32
25
16
27
24
23
3
14
6
18
11
15
17
2
12
4
31
13
22
1
7

PISTON ACCUMULATOR

FIELD OF THE INVENTION

The present invention relates to a piston accumulator.

BACKGROUND INFORMATION

Piston accumulators are typically used to store large quantities of energy. For instance, in hydraulic hybrid vehicles, piston accumulators are used to store energy that is generated during braking of the wheels, for example, and to release energy required for accelerating the vehicle. Such a piston accumulator is described, for example, in German Patent Application No. DE 2006 060 078 A1.

SUMMARY

In contrast to the conventional design approaches, the piston accumulator in accordance with the present invention may offer the advantage that the cylinder is under no significant stress, since the same pressure is present at the cylinder on the inside and the outside. Because of that, the cylinder may be formed of a material that is not pressure-resistant and is therefore light. Because of the circumstance that the cylinder is not deformed, a tight closure is also ensured between the cylinder and a separating piston moving in it. Furthermore, a leak in the cylinder does not lead to hydraulic fluid exiting into the environment, since the hydraulic fluid is caught by the pressure vessel. Moreover, in response to the leak in the pressure vessel, only gas, such as nitrogen escapes, which is harmless to the environment.

BRIEF DESCRIPTION OF THE DRAWING

Exemplary embodiments of the present invention are depicted in the figure and explained in greater detail below.

The figure shows, in longitudinal section, a piston accumulator 1 according to a preferred exemplary embodiment of the present invention.

DETAILED DESCRIPTION OF EXAMPLE EMBODIMENTS

Piston accumulator 1 has a pressure vessel 2. Pressure vessel 2 may be composed of a base body 3 having a generally annular cross section, and covers 4, 5, which close base body 3 at its opposite ends. A cylinder 6 is situated within pressure vessel 2.

Cylinder 6 preferably extends along longitudinal axis 7 of pressure vessel 2. Cylinder 6 may be made up of a base body 11 having an essentially annular cross section and a cover 13 that closes base body 11 at its one end 12. In cylinder 6 a separating piston 14 is provided movably. Separating piston 14, as indicated by double arrow in the figure, is movable along longitudinal axis 7.

Separating piston 14 separates a hydraulic fluid 15 from a gas 16. Hydraulic fluid 15 is located in a chamber 17, which is bordered by base body 11, cover 13 and an end face 18 of separating piston 14. Hydraulic fluid 15 is able to be supplied to chamber 17 and removed from it using a connection 22. It is possible, thereby, to apply hydraulic fluid 15 to piston accumulator 1, in order thus to store energy in it. Furthermore, it is possible to remove hydraulic fluid 15 from piston accumulator 1, in order thus to supply a user with energy.

Gas 16 is located in a chamber 24, which is bordered by an end face 23 of separating piston 14, that is opposite to end face 18, and base body 11. Chamber 24 is connected to an interspace 25 by an opening 26, so that gas 16 is able to flow between chamber 24 and interspace 25. Interspace 25 is formed between cylinder 6 and pressure vessel 2. Interspace 25 may in particular include an annular chamber 27, which surrounds cylinder 6 along longitudinal axis 7. Interspace 25 may also include chambers 31 and 32 in the area of cover 4 and 5.

Furthermore, interspace 25 may be connected by connection 33, on pressure vessel 2, particularly on cover 5, to an additional pressure vessel that is not shown.

After this constructive description of piston accumulator 1, there now follows a representation of its method of functioning.

If, for example, energy is to be stored in piston accumulator 1, hydraulic fluid 15 is supplied to it under pressure. This leads to separating piston 14 moving to the right in the figure. As a result, separating piston 14 compresses gas 16 that is present at end face 23 of separating piston 14. This, however, does not only lead to compression of gas 16 in chamber 24, but also to compression of gas 16 in interspace 25, especially in annular chamber 27. This, in turn, has the effect that, at cylinder 6 entirely the same pressure is present on the inner side and the outer side. Accordingly, cylinder 6 advantageously is not deformed by the effect of hydraulic fluid 15.

Besides chamber 24, interspace 25, in the case at hand, is advantageously prepared to accommodate a comparatively large quantity of gas 16. This comparatively large quantity of gas has a positive effect on the charge characteristics of piston accumulator 1. By “charge characteristics” in this case we mean the course of the pressure in hydraulic fluid 15 or in gas 16, as a function of the charging state, that is, the degree of filling up cylinder 6. Using interspace 25, one may achieve that the pressure change, with which hydraulic fluid 15 is to be acted upon so as further to compress gas 16, is comparatively slight. For a favorable charging characteristic of piston accumulator 1, the gas volume that is able to be accommodated in interspace 25 is at least 1.5 times, preferably at least 2 times greater than the gas volume that is able to be accommodated in chamber 24.

The gas volume accommodated in interspace 25 is designated, in the case at hand, as rear-connected gas volume. By “rear-connected gas volume” is meant, in this instance, a gas volume that is dimensioned in such a way that it is suitable for substantially influencing the charging characteristics of piston accumulator 1.

Using the pressure vessel not shown, which is connected to interspace 25 using connection 33, one is able to increase the rear-connected gas volume even further.

Although the present invention was described above with reference to a preferred exemplary embodiment, it is not limited to that, but may be modified in many ways.

What is claimed is:

1. A piston accumulator, comprising:
   a pressure vessel capped at opposite ends by a first cover and a second cover respectively;
   a cylinder situated within pressure vessel;
   an interspace being between the pressure vessel and the cylinder; and
   a separating piston provided movably in the cylinder;
   wherein a hydraulic fluid acts upon a first side of the separating piston and a gas acts upon a second side of the separating piston, and the gas is in fluidic connection to the interspace and the hydraulic fluid is in fluidic connection to a connection on the cylinder;

wherein the interspace includes:

an annular chamber formed between an outer lateral surface of the cylinder and an inner lateral surface of the pressure vessel, and first and second chambers in communication with the annular chamber, disposed axially of the annular chamber, and situated at opposite axial ends of the cylinder between the vessel and the cylinder, and wherein the first chamber is bounded by the first cover and a first axial end face of the cylinder, and the second chamber is bounded by the second cover and a second axial end face of the cylinder.

2. The piston accumulator as recited in claim 1, wherein the interspace has a rear-connected gas volume.

3. The piston accumulator as recited in claim 2, wherein the rear-connected gas volume is at least 1.5 times than a maximum gas volume in the cylinder.

4. The piston accumulator as recited in claim 3, wherein the rear-connected gas volume is at least 2 times greater than a maximum gas volume in the cylinder.

* * * * *